United States Patent
Inaba

(10) Patent No.: US 7,653,409 B2
(45) Date of Patent: Jan. 26, 2010

(54) RADIO BASE STATION APPARATUS AND METHOD FOR TRANSMISSION POWER CONTROL OF AN UPLINK CHANNEL

(75) Inventor: Arata Inaba, Tokyo (JP)

(73) Assignee: NEC Corporation, Tokyo (JP)

( * ) Notice: Subject to any disclaimer, the term of this patent is extended or adjusted under 35 U.S.C. 154(b) by 477 days.

(21) Appl. No.: 11/389,253

(22) Filed: Mar. 27, 2006

(65) Prior Publication Data

US 2006/0217142 A1  Sep. 28, 2006

(30) Foreign Application Priority Data

Mar. 28, 2005  (JP) ............................. 2005-092652

(51) Int. Cl.
*H04W 52/18* (2009.01)
*H04W 52/38* (2009.01)
(52) U.S. Cl. .......................... 455/522; 455/69
(58) Field of Classification Search ............... None
See application file for complete search history.

(56) References Cited

U.S. PATENT DOCUMENTS

| 2003/0083092 A1 * | 5/2003 | Kim et al. ............... 455/522 |
| 2003/0100329 A1 | 5/2003 | Kwon et al. |
| 2005/0025100 A1 | 2/2005 | Lee et al. |

FOREIGN PATENT DOCUMENTS

| CN | 1488206 A | 4/2004 |
| CN | 1491495 A | 4/2004 |
| EP | 1 207 711 A2 | 5/2002 |
| EP | 1 306 982 A1 | 5/2003 |
| EP | 1 467 500 A2 | 10/2004 |
| JP | 2004-248300 A | 9/2004 |

OTHER PUBLICATIONS

O. Salonaho, et al.: "Flexible Power Allocation for Physical Control Channel in Wideband CDMA"; 1999 IEEE 49TH Vehicular Technology Conference, Houston, TX, USA; May 16-20, 1999; Piscataway, NJ, USA, IEEE, US; vol. 2, pp. 1455-1458, May 16, 1999.
"Universal Mobile Telecommunications System (UMTS); Physical layer procedures (FDD) (3GPP TS 25.214 version 6.3.0 Release 6); ETSI TS 125 214" ETSI Standards, European Telecommunications Standards Institute, Sophia-Antipo, FR; vol. 3-R1, No. V630; Sep. 2004.

* cited by examiner

*Primary Examiner*—Philip J Sobutka
(74) *Attorney, Agent, or Firm*—Sughrue Mion, PLLC

(57) ABSTRACT

To secure proper reception quality for the control signal of an EUDCH during a handover. A transmission power control unit 23 controls transmission power of a downlink control signal of an EUDCH based on at least one of the following information: the CQI in an HS-DPCCH transmitted from a mobile station 30 regarding HSDPA to the mobile station 30, information on the reflection timing of a control pointer of the EUDCH from the mobile station 30, and information on transmission power of the HS-DSCH regarding HSDPA to the mobile station 30. A transmission unit 12 transmits the downlink control signal of the EUDCH to the mobile station 30 with a controlled transmission power.

15 Claims, 4 Drawing Sheets

RADIO BASE STATION APPARATUS AND METHOD FOR TRANSMISSION POWER CONTROL OF AN UPLINK CHANNEL

FIELD OF THE INVENTION

The present invention relates to a radio base station apparatus and a transmission power control method in a radio base station and particularly to a radio base station apparatus that performs transmission power control of a downlink control signal at the time of a handover and its control method.

BACKGROUND OF THE INVENTION

With the development of mobile communication, the demand for broadband access to a downlink such as a large capacity data transfer is increasing. HSDPA (High Speed Downlink Packet Access) is a protocol for such purposes, and the downlink transmission speed of HSDPA is improved to 12 Mbps, compared to 2 Mbps, the transmission speed of W-CDMA (Wideband-Code Division Multiple Access). The development of radio base station apparatuses and mobile terminals supporting HSDPA has increased in recent years.

As a technology corresponding to such an increase in downlink capacity, radio communication systems where an increase in uplink capacity is possible have gained attention, and EUDCH (Enhanced Uplink Dedicated Channel) has been discussed in 3GPP (3rd Generation Partnership Project). EUDCH can be described as an uplink version of HSDPA, and using an EUDCH control signal, a radio base station apparatus can control the data rate that a mobile station can transmit. By performing scheduling, an EUDCH enables a mobile station to transmit large data over the uplink. One of the major points in the discussion in 3GPP regarding the standardization of EUDCH is the handover between sectors (softer handover—SHO) with HSDPA, and what kind of technologies should be implemented in the standard has been debated.

The focus of the debate has been in which cell the scheduling of an EUDCH should be performed in order to realize the softer handover between the EUDCH and HSDPA. One method is to perform the scheduling of the EUDCH in the same cell as the serving cell (i.e. cell under service) for HSDPA. Another method is to perform the scheduling of the EUDCH in the other cell, which is different from the serving cell for HSDPA.

As a related technology, there is disclosed in Patent Document 1 a technology where an EUDCH service can be performed in an optimal radio environment although a UE (User Equipment) using the EUDCH service in a soft handover region receives different scheduling commands from a plurality of active Node Bs.

[Patent Document 1]

Japanese Patent Kokai Publication No. P2004-248300A

The description of this Document is incorporated herein by thereto.

SUMMARY OF THE DISCLOSURE

Concerning in which cell an EUDCH control signal is transmitted and the scheduling is performed in the softer handover between the EUDCH and HSDPA, there are several methods as mentioned above. Specifically speaking, there would be conceivable method as follows: a method that selects the cell where the quality of the downlink is the best, a method that selects the cell where the quality of the uplink is the best, and a method where the scheduling is performed in both the cells.

In order to control throughput properly and secure the reception quality of mobile stations, HSDPA performs scheduling using HARQ (Hybrid Automatic Repeat Request), which is an automatic retransmission processing at the time of a communication error, and the transmission power control of an HS-DSCH (High Speed Downlink Shared Channel) in the downlink. Therefore, selecting the cell where the quality of the downlink is the best means that the scheduling of the EUDCH is performed in the serving cell for HSDPA. In this case, a state occurs where the scheduling of both an HS-DSCH 34 and an EUDCH 33 are being performed in a cell 31 on one side where a softer handover is taking place as shown in FIG. 3. In this state, the downlink resource of the other cell 32, where scheduling is not performed, is left over. Further in this state, since the total transmission power of the whole cell has an upper limit, the transmission power assigned to a control signal of the EUDCH is limited when the throughput of HSDPA is prioritized. As a result, the reception quality of the control signal of the EUDCH at a mobile station 30 is deteriorated. Note that DPCHs (Dedicated Physical Channel) 35 and 36 in FIG. 3 are physical channels for transferring user information and control information between the cells 31 and 32 and the mobile station 30, respectively.

In order to avoid this reception quality deterioration, it would be possible rely on a method that selects the cell where the quality of the uplink is the best. In this case, the scheduling of an EUDCH 37 can be performed in a cell 32a, a cell different from the serving cell 31a for HSDPA as shown in FIG. 4. However, when the scheduling of HSDPA and the EUDCH is performed in different cells, an HS-DSCH 34 and the EUDCH 37 may interfere with each other in the downlink. As a result, there is a possibility that the mobile station 30 is not able to receive the control signal of the EUDCH 37.

It is an object of the present invention to provide a radio base station apparatus and a transmission power control method in a radio base station apparatus that prevents an EUDCH from being interfered by HSDPA and a control signal of the EUDCH from not being received when the scheduling of HSDPA and the EUDCH is performed in different cells.

In order to achieve the above-mentioned object, we pay attention to a technology that realizes a softer handover with an EUDCH by controlling the transmission power of the downlink control signal of the EUDCH while prioritizing the throughput of HSDPA.

According to an aspect of the present invention, there is provided a radio base station apparatus. The radio base station apparatus comprises a transmission power control unit that sets a transmission power of a downlink control signal of an uplink dedicated channel based on at least one of the following information: channel quality indicator information transmitted by a mobile station regarding downlink packet access to the mobile station, information on the reflection timing of a control pointer of an uplink dedicated channel from the mobile station, and transmission power information of a downlink shared channel regarding downlink packet access to the mobile station, and a transmission unit that transmits the downlink control signal with the power set by the transmission power control unit.

In a radio base station apparatus of a first developed form, the transmission power control unit may calculate a correction amount for the transmission power of a downlink control signal based on at least one piece of the information and set corrected transmission power according to the correction amount.

It is preferable that a radio base station apparatus of a second developed form comprise a first demodulation unit that demodulates a dedicated physical control channel transmitted by a mobile station regarding downlink packet access to the mobile station, a decode unit that decodes channel quality indicator information included in the demodulated dedicated physical control channel, and a first correction calculation unit that compares the decoded channel quality indicator information with a reference value, and that calculates a correction amount as a predetermined positive value when the channel quality indicator information is smaller than the reference value and as a predetermined negative value when the channel quality indicator information is not smaller than the reference value.

It is preferable that a radio base station apparatus of a third developed form comprise a second demodulation unit that demodulates an uplink dedicated channel transmitted by a mobile station, a first storage unit that calculates a rate update pointer of the mobile station in the demodulated uplink dedicated channel and stores same, a second storage unit that stores a rate update pointer of the base station in the uplink dedicated channel, a delay storage unit that reads the respective rate update pointer from the first storage unit and the second storage unit and that calculates a delay amount from the difference between the rate update pointers, and a second correction calculation unit that compares the delay amount and a threshold value and that calculates a correction amount as a predetermined positive value when the delay amount is greater than the threshold value and as a predetermined negative value when the delay amount is not greater than the threshold value.

It is preferable that a radio base station apparatus of a fourth developed form comprises a power storage unit that calculates a transmission power of a downlink dedicated channel regarding downlink packet access and stores same, and a third correction calculation unit that compares the transmission power of the downlink dedicated channel with the transmission power of the same before a predetermined period of time and that calculates a correction amount as a predetermined positive value when the transmission power decreases after the predetermined period of time and as a predetermined negative value when the transmission power increases after the predetermined period of time.

In a radio base station apparatus of a fifth developed form, the transmission power of a downlink control signal may be controlled upon a handover.

According to another aspect of the present invention, there is provided a transmission power control method in which a radio base station apparatus controls transmission power for a mobile station. In this method, a transmission power of a downlink control signal of an uplink dedicated channel is controlled based on at least one of the following information: channel quality indicator information transmitted by the mobile station regarding downlink packet access to the mobile station, information on the reflection timing of the control pointer of an uplink dedicated channel from the mobile station, and transmission power information of a downlink shared channel regarding the downlink packet access to the mobile station.

The meritorious effects of the present invention are summarized as follows.

According to the present invention, even during a softer handover between an EUDCH and HSDPA, proper reception quality can be secured without lowering the throughput of HSDPA for the control signal of the EUDCH.

PREFERRED EMBODIMENTS OF THE INVENTION

Figure 1:
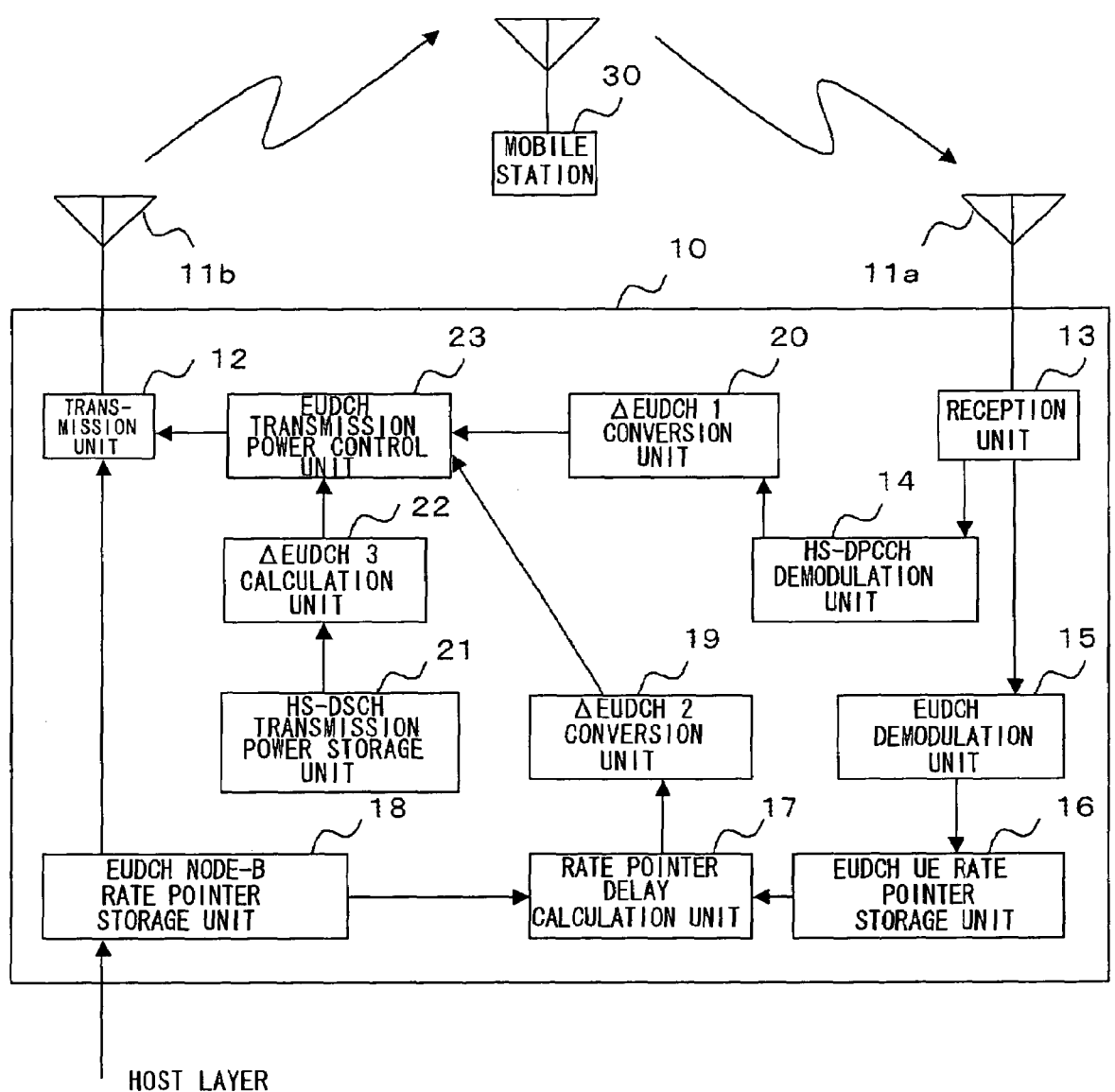
FIG. 1 is a block diagram illustrating the structure of a radio base station apparatus relating to an embodiment of the present invention.

A radio base station apparatus relating to the present invention is an apparatus that controls the downlink transmission power during the handover between sectors of a serving cell for an EUDCH and a serving cell for HSDPA (softer handover: SHO) using a radio base station apparatus and a radio communication system supporting EUDCH services. In other words, during the softer handover with the serving cell for HSDPA, the transmission power of a downlink control signal is controlled so that a mobile station can receive a high-quality downlink control signal of the EUDCH in order to improve the scheduling accuracy of the EUDCH. Further, in order to maintain the throughput of HSDPA engaging in the softer handover, while monitoring the HS-DSCH transmission power of the downlink, the downlink transmission power of the EUDCH is controlled with proper values accordingly. More concretely, the radio base station apparatus controls the transmission power based on the processings of (A), (B), and (C) as follows.

(A) By utilizing the CQI (Channel Quality Indicator) of an HS-DPCCH (High Speed-Dedicated Physical Control Channel) transmitted by a mobile station receiving from a serving cell for HSDPA, the quality of a downlink CPICH (Common Pilot Channel) received by the mobile station can be known. Then, by increasing the transmission power of the EUDCH control signal when the downlink quality is low and decreasing the transmission power when the downlink quality is high, the downlink quality is adaptively reflected to the transmission power of the EUDCH control signal.

(B) The data rate of the EUDCH from the mobile station apparatus is controlled with pointers, and the reflection timing difference between a pointer administered by the radio base station apparatus and a pointer administered by the mobile station apparatus is utilized. From this reflection timing difference, the quality of the EUDCH control signal received by the mobile station can be known. The radio base station apparatus controls the data rate transmitted by the mobile station apparatus, and if the reflection timing of a pointer is slow (delaying) when the rate is updated, the transmission power of the EUDCH control signal will be increased because it means the downlink quality is poor. On the other hand, if the reflection timing of the pointer is fast (ahead), the transmission power of the EUDCH control signal will be decreased. By controlling as described, the downlink quality is adaptively reflected to the transmission power of the EUDCH control signal. Note that, here, we assume that a system where the mobile station apparatus controls so as to set the transmission data rate as high as possible when the radio base station apparatus permits the mobile station apparatus to set the transmission data rate for using the EUDCH is used.

(C) By storing the transmission power of the HS-DSCH, the reception quality of the downlink HS-DSCH in the serving cell for HSDPA can be known. When the transmission power of the HS-DSCH increases, it means that the downlink quality of the HS-DSCH has decreased because the control signal of the EUDCH has suffered an interference, then the transmission power of the HS-DSCH is increased in order to maintain the throughput of HSDPA. In this case, the decrease of the throughput of HSDPA is avoided by lowering the transmission power of the EUDCH control signal. Further, when the transmission power of the HS-DSCH decreases, it means that the interference amount of the EUDCH has lowered. Therefore, the quality of the EUDCH control signal is improved by increasing the transmission power of the EUDCH control signal. As described, the radio base station apparatus has the transmission power of the HS-DSCH reflected to the transmission power of the EUDCH control signal so that the throughput of HSDPA is maintained by controlling the transmission power of the EUDCH control signal based on the HS-DSCH as a reference.

In the above descriptions, the purpose of (A) and (B) is to increase the downlink quality of the EUDCH, and the reception quality of the EUDCH control signal at the mobile station is secured by having the radio base station recognize the downlink quality. The purpose of (C) is to secure the downlink quality of the HS-DSCH. The transmission power of the EUDCH control signal is controlled by one or a combination of these means. By controlling the transmission power, the downlink transmission power value of the EUDCH control signal can be properly controlled while maintaining the throughput of HSDPA even when the control signal of the EUDCH is interfered by HSDPA. And the control signal of the EUDCH can be received by the mobile station at a high quality even during the softer handover between the EUDCH and HSDPA.

The radio base station apparatus that controls the transmission power as described above can efficiently utilizes the downlink resources of the serving cell for the EUDCH and can realize the softer handover between the EUDCH and HSDPA while maintaining the throughput of HSDPA.

Embodiment

FIG. 1 is a block diagram illustrating the structure of a radio base station apparatus relating to an embodiment of the present invention. In FIG. 1, a radio base station apparatus 10 comprises antennas 11a and 11b, a transmission unit 12, a reception unit 13, an HS-DPCCH (High Speed-Dedicated Physical Control Channel) demodulation unit 14, an EUDCH demodulation unit 15, an EUDCH UE rate pointer storage unit 16, a rate pointer delay calculation unit 17, an EUDCH Node-B rate pointer storage unit 18, a Δ EUDCH 2 conversion unit 19, a Δ EUDCH 1 conversion unit 20, an HS-DSCH transmission power storage unit 21, a Δ EUDCH 3 calculation unit 22, and an EUDCH transmission power control unit 23. Further, the radio base station apparatus 10 sends/receives various signals between a host station and a mobile station 30, and has various functions such as call connection process, channel switching process, and location registration process, however, only the transmission power control of a downlink control signal of an EUDCH in the present invention will be described here and explanations of the other functions will be omitted.

The transmission unit 12 sends a transmission signal including an EUDCH control signal to the mobile station 30 via the antenna 11b. The reception unit 13 receives a reception signal including the EUDCH and HS-DSCH from the mobile station 30 via the antenna 11a. The HS-DPCCH demodulation unit 14 demodulates the uplink HS-DSCH transmitted by the mobile station that has received a downlink dedicated channel from the serving cell for HSDPA. The EUDCH demodulation unit 15 demodulates the uplink control signal of the EUDCH. The EUDCH UE rate pointer storage unit 16 stores the data rate pointer of the EUDCH demodulated by the EUDCH demodulation unit 15 and transmitted by the mobile station 30. The rate pointer delay calculation unit 17 measures the reflection time difference between the EUDCH UE rate pointer and the EUDCH Node-B rate pointer. The EUDCH Node-B rate pointer storage unit 18 is connected to a host layer and stores the transmission data rate of the EUDCH that the radio base station specifies for the mobile station 30. The Δ EUDCH 2 conversion unit 19 calculates the correction amount of the downlink transmission power of the EUDCH control signal based on the reflection time difference measured by the rate pointer delay calculation unit 17. The Δ EUDCH 1 conversion unit 20 calculates the correction amount of the downlink transmission power of the EUDCH control signal according to the reception CQI in the HS-DPCCH. The HS-DSCH transmission power storage unit 21 stores the HS-DSCH transmission power transmitted by the serving cell for HSDPA. When the serving cell for HSDPA is the radio base station apparatus 10, the information of an HS-DSCH transmission power not shown in the drawing is used. Further, when the serving cell for HSDPA is a radio base station apparatus different from the radio base station apparatus 10, the HS-DSCH transmission power storage unit 21 receives the information of the HS-DSCH transmission power via the host station not shown in the drawing. The Δ EUDCH 3 calculation unit 22 calculates the correction amount of the HS-DSCH transmission power and the downlink transmission power of the EUDCH control signal. The EUDCH transmission power control unit 23 determines the final transmission power of the EUDCH control signal from the correction amounts calculated by the Δ EUDCH 2 conversion unit 19, the Δ EUDCH 1 conversion unit 20, and the Δ EUDCH 3 calculation unit 22 respectively.

The radio base station apparatus 10 structured as described above determines the final transmission power of the EUDCH control signal by the correction processings on the transmission power as described in (i), (ii), and (iii) below.

(i) During the softer handover between the EUDCH and HSDPA, the radio base station apparatus 10 receives the EUDCH and the HS-DPCCH in addition to a dedicated channel (DPCH: Dedicated Physical Channel) in the uplink direction. The HS-DPCCH and the EUDCH are demodulated by the HS-DPCCH demodulation unit 14 and the EUDCH demodulation unit 15 respectively.

The HS-DPCCH includes an ACK/NACK signal that issues a repeat request used in HARQ of the downlink HS-DSCH data and a CQI signal that indicates the reception quality of a downlink CPICH. Here we will focus on the CQI signal. The mobile station 30 gives values of 0 to 31 to the CQI signal according to the downlink quality of the CPICH and transmits the value to the radio base station apparatus 10. When the reception quality is the best, it transmits a value of 31, and when it is the worst, a value of 0 is transmitted. Since the transmission power of the CPICH is fixed, the greater the value of the CQI signal, the better the reception quality of the downlink CPICH. And it means that the propagation environment between the radio base station apparatus 10 and the mobile station 30 is good. Conversely, when the value of the CQI signal is small, it means that the downlink propagation environment is bad.

In order to have the mobile station 30 receive the downlink control signal of the EUDCH at a high quality, the radio base station apparatus 10 needs to transmit it to the mobile station 30 with high power when the propagation environment is bad. In this case, the worse the propagation environment is, the higher the power should be. Then the Δ EUDCH 1 conversion unit 20 controls the downlink transmission power of the EUDCH control signal corresponding to the CQI received according to an expression (1).

$$\Delta EUDCH1 = CQIInit - ReceivedCQI \qquad \text{Expression (1)}$$

Here, Δ EUDCH1 is the control amount reflected on the downlink transmission power of the EUDCH control signal and its unit is [dB]. CQIInit is the reference value of the CQI. For instance, it is set to 15.5, the central value between 0 to 31. ReceivedCQI indicates the CQI received by the HS-DPCCH demodulation unit 14.

From the expression (1), when the received CQI is smaller than the reference value, the transmission power of the EUDCH control signal is increased, and when the received CQI is greater than the reference value, the transmission power of the EUDCH control signal is decreased. By controlling as described above, the transmission power of the EUDCH control signal does not increase more than necessary and it does not interfere with HSDPA. As a result, it becomes possible to maintain the throughput of HSDPA. Note that the shortest update cycle of the Δ EUDCH 1 is 2 [ms], the TTI (Transmission Time Interval) of the HS-DPCCH, and when the CQI is repeating, the update cycle of the Δ EUDCH 1 is the same as the cycle in which the HS-DPCCH demodulation unit 14 detects the CQI.

(ii) Next, the relationship between the transmission data rate of the EUDCH and the downlink transmission power of the EUDCH control signal will be explained. The uplink EUDCH is demodulated by the EUDCH demodulation unit 15 and can measure the data rate transmitted by the mobile station 30. Further, the control signal of the EUDCH is transmitted from the radio base station apparatus 10 to the mobile station 30 through the downlink and performs scheduling by notifying the data rate that the mobile station 30 can transmit. In the transmission of the EUDCH, the mobile station 30 transmits data in a unit called TFC (Transport Format Combination). The mobile station 30 has a function called TFC selection and can adjust the transmission data rate. The radio base station apparatus 10 transmits the maximum TFCs allowed to the mobile station 30 using the downlink control signal. Here, we assume that a system where the mobile station 30 controls so as to increase the data rate uplink to this maximum TFCs allowed is used. The radio base station apparatus 10 stores the pointer controlling the TFC notified by the host layer in the EUDCH Node-B rate pointer storage unit 18. Further, by demodulating the uplink EUDCH, the pointer to the TFC transmitted by the mobile station 30 is administered. As a result, the radio base station apparatus 10 can know the difference in the TFC control pointer between itself and the mobile station 30.

Here, the difference in the TFC control pointer between the radio base station apparatus 10 and the mobile station 30 is applied to controlling the downlink transmission power of the EUDCH control signal. The TFC control pointer is transmitted to the mobile station 30 from the radio base station apparatus 10 through the downlink EUDCH control signal. After receiving it, the mobile station 30 controls the TFC according to the variation amount of the TFC control pointer. In other words, when the quality of the downlink EUDCH control signal is high, the mobile station 30 is fast in controlling the TFC. On the other hand, when it is slow in doing so, an error occurs in the control signal because the quality of the downlink EUDCH is low and it is likely that the TFC selection function of the mobile station 30 cannot be controlled correctly.

When the host layer notifies the radio base station apparatus 10 of an update on the TFC control pointer, this update time information is stored in the EUDCH Node-B rate pointer storage unit 18. This update time is called Tupdate (Node-B). Furthermore, an EUDCH UE rate pointer is calculated from the demodulation result of the EUDCH received from the mobile station 30 through the uplink, and the update time information is stored in the EUDCH UE rate pointer storage unit 16. This update time is called Tupdate (UE). The rate pointer delay calculation unit 17 calculates a time difference Δ t using these two update times according to an expression (2).

$$\Delta t = Tupdate(UE) - Tupdate(Node\text{-}B) \qquad \text{Expression (2)}$$

Here, the unit of Δ t is [ms].

Since the TTI of the EUDCH is 2 [ms], Δ t can be calculated with a minimum accuracy of 2 [ms]. The Δ EUDCH 2 conversion unit 19 determines the downlink transmission power control amount Δ EUDCH2 of the EUDCH control signal using Δ t calculated from the expression (2). A concrete method is as follows. First, a threshold value is provided for Δ t. Δ EUDCH2 is set to a positive value when Δ t is higher than the threshold value, and the transmission power of the EUDCH control signal is increased. On the other hand, Δ EUDCH2 is set to a negative value when Δ t is below the threshold value, and the transmission power of the EUDCH control signal is decreased.

In other words, the greater Δ t is, the longer the update cycle of the TFC control pointer gets. Therefore, when the Δ t value is great, it means that the mobile station 30 is not receiving the downlink EUDCH control signal correctly and the quality of the downlink is poor. It is necessary to increase the transmission power of the downlink EUDCH control signal in order to have the mobile station 30 receive the downlink EUDCH control signal correctly. Note that the control unit of Δ EUDCH2 is [dB].

(iii) The transmission power of the downlink HS-DSCH is information that should be reflected on the downlink EUDCH transmission power. During the softer handover between the serving cells for the EUDCH and HSDPA, the control signal of the downlink EUDCH and the downlink HS-DSCH are interfering with each other. Then, if the reception quality of the control signal of the EUDCH in the downlink deteriorates, the characteristics of the EUDCH will suffer, and if the reception quality of the HS-DSCH deteriorates, the throughput of HSDPA will decrease. Therefore, it is necessary to control the transmission power of the EUDCH control signal with a proper value while maintaining the throughput of HSDPA. Here, we pay attention to the transmission power value of the downlink HS-DSCH.

In HSDPA, in order to maintain the throughput, the radio base station apparatus controls the transmission power of the HS-DSCH so that the reception quality of the downlink HS-DSCH at the mobile station 30 is fixed. In the transmission power control of the HS-DSCH, when the transmission power of the HS-DSCH increases, it indicates that the downlink quality of HSDPA at the mobile station 30 has decreased. In other words, it indicates that there is a possibility that HSDPA is interfering with the mobile station 30 which the downlink EUDCH is engaging in a softer handover with. Conversely, when the transmission power of the HS-DSCH decreases, it indicates that the downlink quality has increased. In other words, it means that increasing the transmission power of the EUDCH has been permitted. Then, the Δ EUDCH 3 calculation unit 22 controls the downlink transmission power of the EUDCH control signal according to an expression (3) using the transmission power value of the downlink HS-DSCH stored in the HS-DSCH transmission power storage unit 21.

$$\Delta EUDCH3 = -\Delta PHS\text{-}DSCH(m) = -(PHS\text{-}DSCH(m) - PHS\text{-}DSCH(m-1)) \quad \text{Expression (3)}$$

Here, m indicates the subframe number of HSDPA, and since the TTI of HSDPA is 2 [ms], the control of Δ EUDCH3 can be performed in a cycle of 2 [ms]. PHS-DSCH(m) and PHS-DSCH(m−1) indicate the transmission power of the HS-DSCH at $m^{th}$ and $m-1^{th}$ subframes respectively, and Δ PHS-DSCH(m) indicates the transmission power difference of the HS-DSCH between $m^{th}$ and $m-1^{th}$ subframes. Note that the reference value of PHS-DSCH(m) is a value notified by the host when HSDPA is set up. Further, the units of the parameters used in the expression (3) are all [dB].

According to the expression (3), when the transmission power of the HS-DSCH increases between subframes, the value of Δ EUDCH3 should be lowered since it indicates the downlink quality of HSDPA has decreased. On the other hand, when the transmission power of the HS-DSCH decreases, the value of Δ EUDCH3 should be increased.

The transmission power of the HS-DSCH depends not only on the downlink quality, but also on the unused transmission power in the serving cell for HSDPA and the transmission data rate of the HS-DSCH. The radio base station apparatus 10 monitors the total transmission power and allocates unused transmission power to the HS-DSCH. Therefore, when the transmission power of the HS-DSCH is changed because of the total transmission power control or when the transmission power of the HS-DSCH is changed because the transmission data rate has been changed, Δ PHS-DSCH=0 holds, and the transmission power control of the EUDCH control signal is not performed because of the change in the transmission power of the HS-DSCH.

In order for the radio base station apparatus 10 to know the interference amount in the downlink of HSDPA, it is necessary to measure the interference amount at the mobile station 30 and transmit it to the radio base station apparatus 10. However, in this method, since the processing of transmitting the interference amount must be added to the functions of the mobile station 30 and the radio base station apparatus 10 must have a way to correctly demodulate the interference amount transmitted by the mobile station, the processing will become complex. Therefore, we will use the transmission power of the HS-DSCH as a simple way to know the interference amount at the mobile station 30.

The EUDCH transmission power control unit 23 determines the final transmission power of the EUDCH control signal PEUDCH according to the following expression (4) using the values of Δ EUDCH1, Δ EUDCH2, and Δ EUDCH3 calculated in (i), (ii), and (iii) as described above.

$$PEUDCH = PEUDCH(\text{Init}) + \Delta EUDCH1 + \Delta EUDCH2 + \Delta EUDCH3 \quad \text{Expression (4)}$$

Here, the unit used is [dB]. Further, PEUDCH(Init) is the initial value of the transmission power of the EUDCH control signal set by the host when the EUDCH is set up.

The transmission unit 12 transmits the EUDCH control signal with the transmission power PEUDCH calculated by the expression (4).

Figure 2:
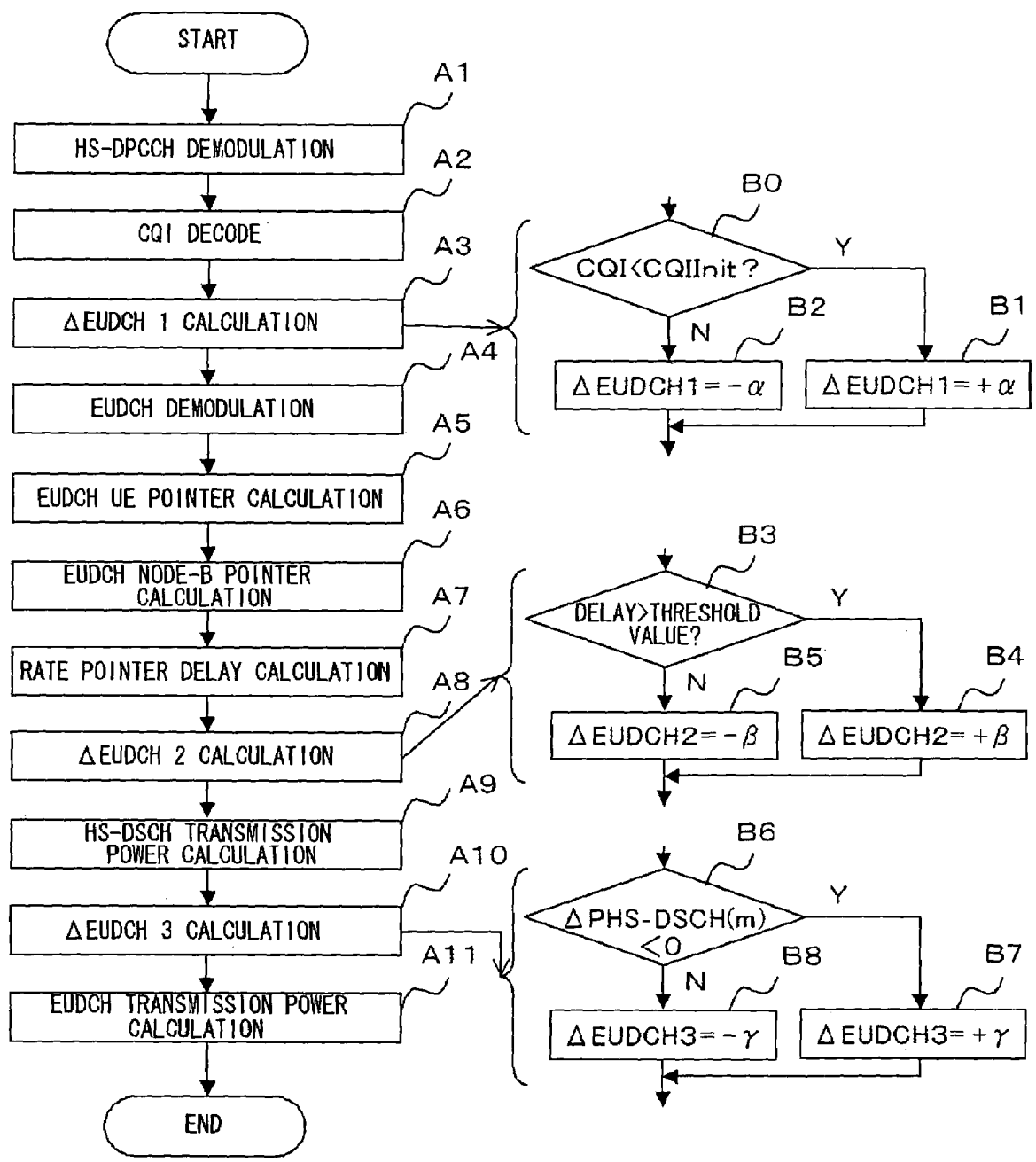
FIG. 2 is a flowchart illustrating the operation of the radio base station apparatus relating to the embodiment of the present invention.
Figure 3:
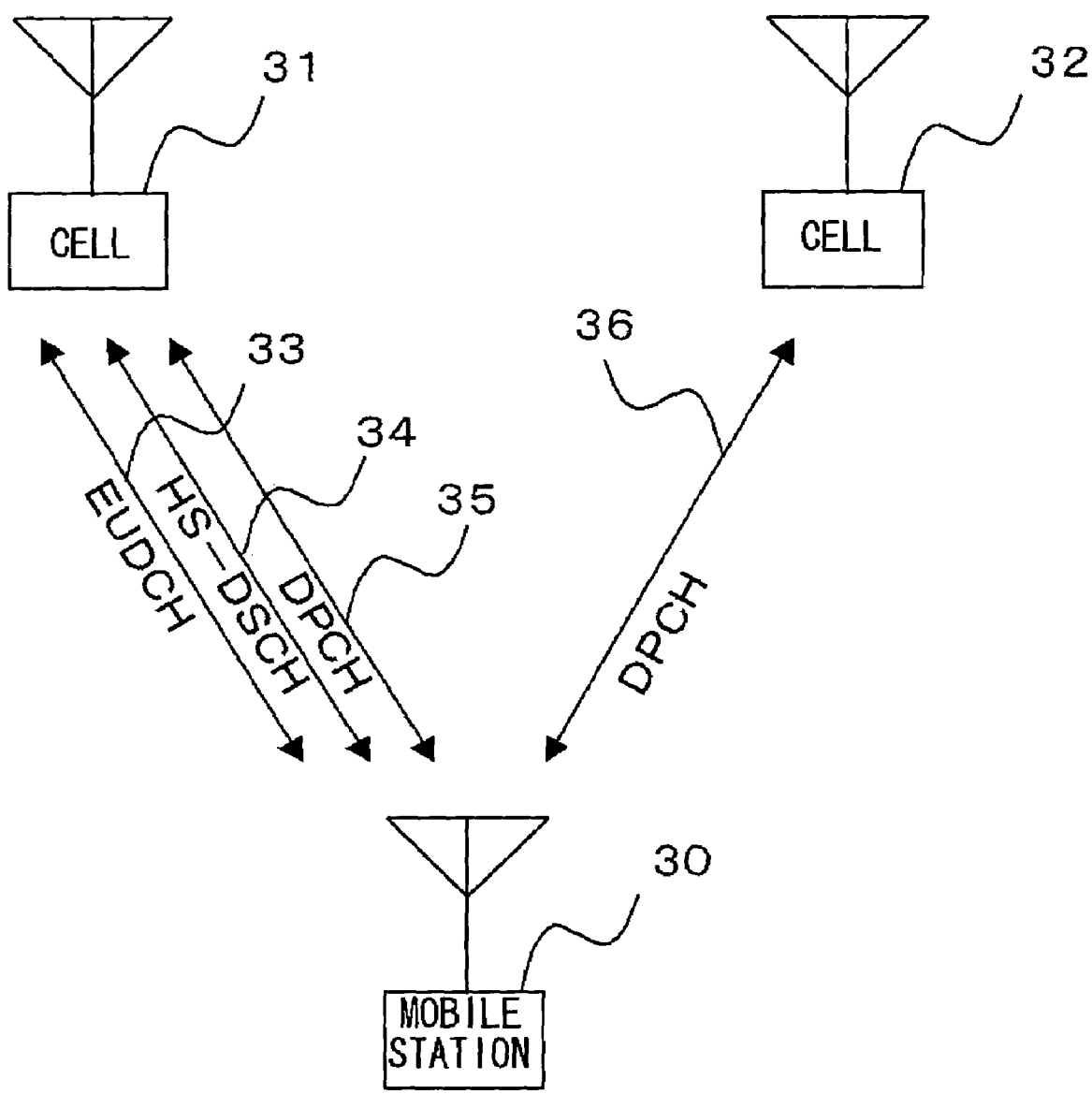
FIG. 3 is a first diagram schematically showing transmission between cells during handover.
Figure 4:
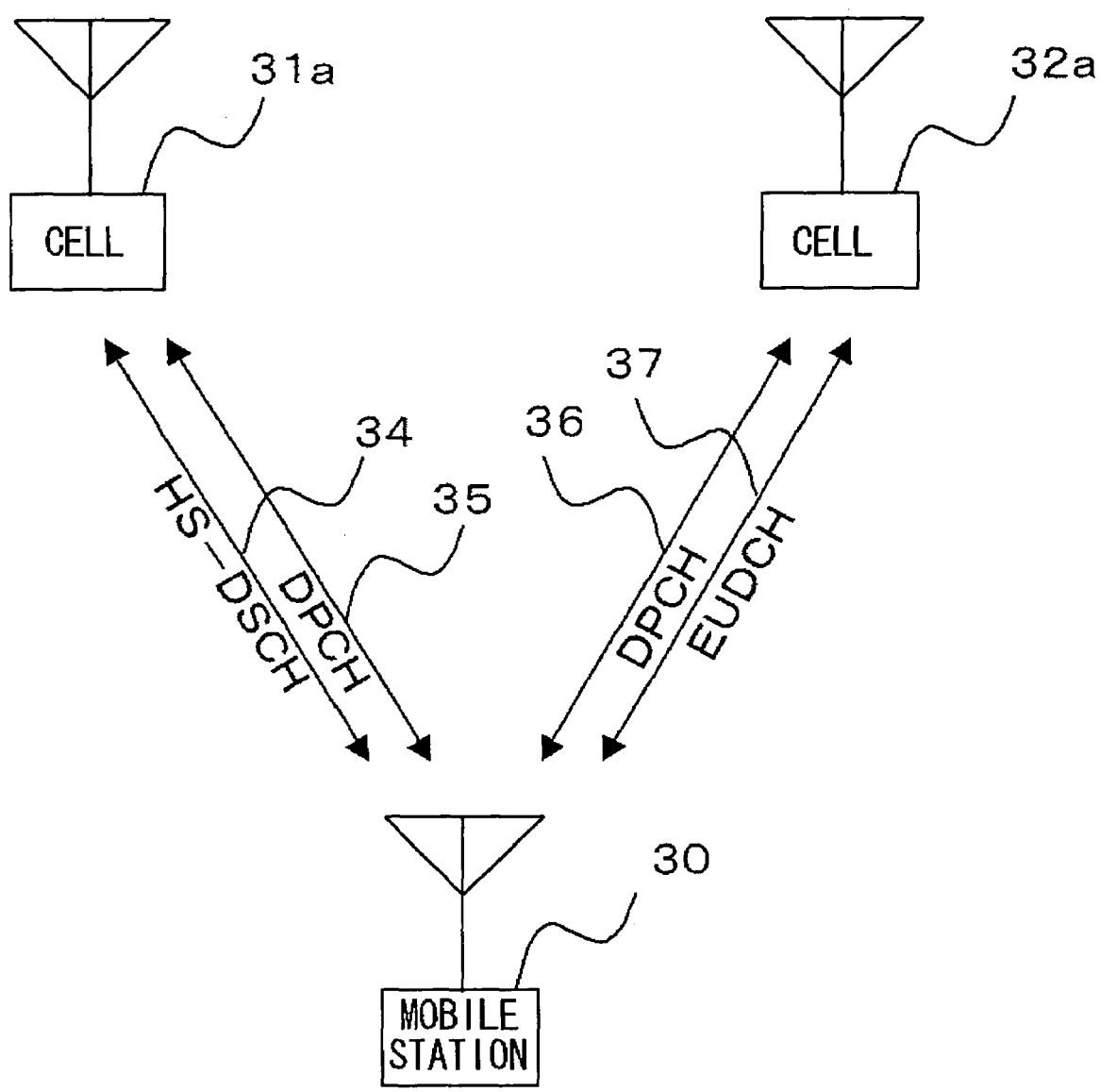
FIG. 4 is a second diagram schematically showing transmission between cells during handover.

Next, how the radio base station apparatus 10 controls the power of the EUDCH control signal will be described. FIG. 2 is a flowchart illustrating the operation of the radio base station apparatus relating to the embodiment of the present invention. First, the radio base station apparatus 10 demodulates the HS-DPCCH in a step A1. In a step A2, the CQI is decoded using the result of the HS-DPCCH demodulation. When the received CQI is determined, Δ EUDCH1 is calculated in a step A3. As the method of calculating Δ EUDCH1, the received CQI and CQIInit are compared in a step B0. As a result of the comparison, if the received CQI is smaller than CQIInit, Δ EUDCH1 will be set to a positive value α in a step B1. Conversely, if the received CQI is greater than CQIInit, Δ EUDCH1 will be set to a negative value −α in a step B2. Note that the value of CQIInit is fixed here, however, it is possible to set a proper Δ EUDCH1 value by varying the CQIInit value even when the propagation environment is less than ideal because of the radio wave propagation environment surrounding the radio base station apparatus.

Next, the EUDCH is demodulated in a step A4. Using the result of this EUDCH demodulation, an EUDCH UE pointer is calculated in a step A5. Then, in a step A6, an EUDCH Node-B pointer is calculated according to the TFC value notified by the host. In a step A7, a rate pointer delay i.e. the reflection timing difference (the time difference Δ t) of the pointers is calculated using the pointers calculated in the steps A5 and A6. In a step A8, Δ EUDCH2 is calculated from this delay amount (time difference). As the method of calculating Δ EUDCH2, this delay amount and threshold value are compared in a step B3. As a result of the comparison, if the delay amount is greater than the threshold value, Δ EUDCH2 will be set to a positive value β in a step B4. Conversely, if the delay amount is smaller than the threshold value, Δ EUDCH2 will be set to a negative value −β in a step B5.

Next, the transmission power of the HS-DSCH is calculated in a step A9. In a step A10, Δ EUDCH3 is calculated using the HS-DSCH transmission power. In calculating Δ EUDCH3 in a step B6, when the power at a subframe m is smaller than the power at a subframe m−1, it means that the transmission power of the HS-DSCH has decreased. In this case, Δ EUDCH3 is set to a positive value γ in a step B7. Conversely, when the transmission power at a subframe m is greater than the power at a subframe m−1, it means that the transmission power of the HS-DSCH has increased. In this case, Δ EUDCH3 is set to a negative value −γ in a step B8.

In a step A11, the transmission power of the EUDCH control signal is calculated using Δ EUDCH1, Δ EUDCH2, and Δ EUDCH3 calculated in the steps A3, A8, and A10 respectively. And using this transmission power value calculated, the EUDCH control signal is transmitted to the mobile station 30 via the downlink.

As described above, the radio base station apparatus 10 has the function of varying the transmission power of the EUDCH control signal according to the value of the CQI (channel quality indicator). Therefore, it can control the transmission power of the EUDCH control signal in real time according to the downlink quality and can secure the reception quality of the EUDCH control signal at the mobile station even in a propagation environment where the reception quality at the mobile station changes in a short period of time.

Further, by monitoring the control pointer of the TFC in order to know the reflection timing of the rate pointer transmitted by the mobile station, whether or not the mobile station is correctly receiving the EUDCH control signal transmitted by the radio base station apparatus 10 is determined. When the radio base station apparatus determines that the mobile station is receiving the signal correctly, the downlink quality is thought to be high and the transmission power of the EUDCH control signal is decreased, and when it determines that it is not, the downlink quality is thought to be low and the transmission power of the EUDCH control signal is increased. By this function, even during the softer handover with HSDPA, the accuracy of the radio base station apparatus in estimating the uplink data rate of the EUDCH is improved by transmitting the EUDCH control signal with a proper transmission power, and the uplink data rate of the mobile station can be controlled at a higher speed.

Further, by monitoring the transmission power of the HS-DSCH in real time, the downlink quality can be known. When the HS-DSCH transmission power increases, it is determined that the downlink quality has decreased because the control signal of the EUDCH has suffered interference, and the transmission power of the EUDCH control signal is decreased in order to keep the throughput of HSDPA from decreasing. Further, when the HS-DSCH transmission power decreases, it is determined that the downlink quality has increased, and the transmission power of the EUDCH control signal is increased in order to increase the quality of the EUDCH control signal even more. As described above, by controlling the transmission power of the EUDCH control signal with a proper value, the throughput of HSDPA can be maintained.

Note that the present invention is not limited to the above embodiment, and it can be applied to the case of a handover between HSDPA and an EUDCH and a different radio base station (DHO: Diversity Handover) for instance. It is also not limited to the softer handover with the serving cell for HSDPA, and it can be applied to EUDCH downlink transmission power control by monitoring the downlink transmission power of a normal DPCH. Furthermore, among W-CDMA wireless communication systems, it can be applied to a wireless communication system using a modulation method for next-generation high-speed wireless packet access such as OFDM (Orthogonal Frequency Division Multiplexing).

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A radio base station apparatus comprising:
   a transmission power control unit that sets a transmission power at which a control signal is transmitted in a downlink, where the control signal controls the transmission power of an uplink dedicated channel and the transmission power at which the control signal is transmitted is based on: channel quality indicator information transmitted by a mobile station regarding downlink packet access to said mobile station, information on the reflection timing of a control pointer of an uplink dedicated channel from said mobile station, and transmission power information of a downlink shared channel regarding downlink packet access to said mobile station; and
   a transmission unit that transmits said control signal to said mobile station with the power set by said transmission power control unit.

2. The radio base station apparatus as defined in claim 1 wherein said transmission power control unit calculates a correction amount for the transmission power of said control signal based on at least one of said pieces of information and sets corrected transmission power according to said correction amount.

3. The radio base station apparatus as defined in claim 2 comprising:
   a first demodulation unit that demodulates a dedicated physical control channel transmitted by said mobile station regarding downlink packet access to said mobile station;
   a decode unit that decodes said channel quality indicator information included in said demodulated dedicated physical control channel; and
   a first correction calculation unit that compares said decoded channel quality indicator information with a reference value, and that calculates said correction amount as a predetermined positive value when said channel quality indicator information is smaller than said reference value and as a predetermined negative value when said channel quality indicator information is not smaller than said reference value.

4. The radio base station apparatus as defined in claim 2 comprising:
   a second demodulation unit that demodulates said uplink dedicated channel transmitted by said mobile station;
   a first storage unit that calculates a rate update pointer of said mobile station in said demodulated uplink dedicated channel and stores same;
   a second storage unit that stores a rate update pointer of the base station in said uplink dedicated channel;
   a delay storage unit that reads the respective rate update pointer from said first storage unit and said second storage unit and that calculates a delay amount from the difference between the rate update pointers; and
   a second correction calculation unit that compares said delay amount and a threshold value and that calculates said correction amount as a predetermined positive value when said delay amount is greater than said threshold value and as a predetermined negative value when said delay amount is not greater than said threshold value.

5. The radio base station apparatus as defined in claim 2 comprising:
   a power storage unit that calculates a transmission power of a downlink dedicated channel regarding said downlink packet access and stores same; and
   a third correction calculation unit that compares the transmission power of said downlink dedicated channel with the transmission power of the same before a predetermined period of time and that calculates said correction amount as a predetermined positive value when the transmission power decreases after the predetermined period of time and as a predetermined negative value when the transmission power increases after the predetermined period of time.

6. The radio base station apparatus as defined in claim 1 wherein the transmission power at which said control signal is transmitted is controlled upon a handover.

7. A transmission power control method at a radio base station apparatus comprising:
   providing a radio base station apparatus; and
   controlling transmission power to a mobile station or stations by the radio base station apparatus, comprising
   controlling a transmission power at which a control signal is transmitted in a downlink is transmitted is based on: channel quality indicator information transmitted by said mobile station regarding downlink packet access to said mobile station, information on the reflection timing of the control pointer of an uplink dedicated channel from said mobile station, and transmission power information of a downlink shared channel regarding downlink packet access to said mobile stations, wherein the control signal comprises information to control a transmission power of an uplink dedicated channel.

8. The transmission power control method at a radio base station apparatus as defined in claim 7 wherein said channel quality indicator information indicates the communication quality of said downlink packet access, and control is carried out so that said transmission power is increased when said communication quality is lower than a predetermined value and said transmission power is decreased when said communication quality is higher than said predetermined value.

9. The transmission power control method at a radio base station apparatus as defined in claim 7 wherein said reflection timing information is a time difference between a rate update pointer set by the base station and a rate update pointer set by said mobile station, and control is carried out so that said transmission power is increased when said time difference is greater than a predetermined threshold value and said transmission power is decreased when said time difference is not greater than said threshold value.

10. The transmission power control method at a radio base station apparatus as defined in claim 7 wherein said transmission power information is a change in the transmission power of said shared channel over time, and control is carried out so that the transmission power at which said control signal is transmitted is decreased when the transmission power of said shared channel increases after a predetermined period of time and the transmission power at which said control signal is transmitted is increased when the transmission power of said shared channel decreases after said predetermined period of time.

11. The transmission power control method at a radio base station apparatus as defined in claim 7 wherein a correction amount for the transmission power at which said control signal is transmitted is calculated based on at least one of said pieces of information, and said control signal is transmitted with a transmission power that has been corrected with said corrected amount.

12. The transmission power control method at a radio base station apparatus as defined in claim 11, comprising the steps of:

demodulating a dedicated physical control channel transmitted by said mobile station regarding downlink packet access to said mobile station;

a step of decoding said channel quality indicator information included in said demodulated dedicated physical control channel;

a step of comparing said decoded channel quality indicator information with a reference value; and a step of calculating said correction amount as a predetermined positive value when said channel quality indicator information is smaller than said reference value and as a predetermined negative value when said channel quality indicator information is not smaller than said reference value as a result of said comparison.

13. The transmission power control method at a radio base station apparatus as defined in claim 11, comprising the steps of:

a step of demodulating an uplink dedicated channel transmitted by a mobile station;

a step of calculating a rate update pointer of a mobile station in said demodulated uplink dedicated channel;

a step of calculating a delay amount of said calculated rate update pointer compared with a rate update pointer set by a base station;

a step of comparing said calculated delay amount with a threshold value; and a step of calculating said correction amount as a predetermined positive value when said delay amount is greater than said threshold value and as a predetermined negative value when said delay amount is not greater than said threshold value as a result of said comparison.

14. The transmission power control method at a radio base station apparatus as defined in claim 11, comprising the steps of:

a step of calculating a transmission power of a downlink dedicated channel regarding said downlink packet access;

a step of comparing a calculated transmission power of said downlink dedicated channel with a transmission power of the same before a predetermined period of time; and a step of calculating said correction amount as a predetermined positive value when the transmission power decreases after the predetermined period of time and as a predetermined negative value when the transmission power increases after the predetermined period of time as a result of said comparison.

15. The transmission power control method at a radio base station apparatus as defined in claim 7 that is executed upon a handover.

* * * * *